United States Patent
Hsu et al.

(10) Patent No.: US 10,275,637 B2
(45) Date of Patent: Apr. 30, 2019

(54) FINGERPRINT IDENTIFICATION MODULE

(71) Applicant: Primax Electronics Ltd., Taipei (TW)

(72) Inventors: Mao-Hsiu Hsu, Taipei (TW); Kuan-Pao Ting, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 198 days.

(21) Appl. No.: 15/585,647

(22) Filed: May 3, 2017

(65) Prior Publication Data

US 2018/0196986 A1 Jul. 12, 2018

(30) Foreign Application Priority Data

Jan. 6, 2017 (TW) ............... 106100446 A (51) Int. Cl.
*G06K 9/00* (2006.01)

(52) U.S. Cl.
CPC ....... *G06K 9/00053* (2013.01); *G06K 9/0002* (2013.01)

(58) Field of Classification Search
CPC .. G06K 9/00053; G06K 9/0002; G06K 9/209; H01L 2924/181; H01L 23/4985; H01L 23/3121; H01L 2924/15174; H01L 21/4875; H01L 2224/2413; H01L 23/5383; G06F 2203/0338; Y10T 29/4913; Y10T 29/49146
See application file for complete search history.

(56) References Cited

U.S. PATENT DOCUMENTS

| 6,011,859 | A * | 1/2000 | Kalnitsky | G06K 9/00053 382/100 |
|---|---|---|---|---|
| 6,347,040 | B1 * | 2/2002 | Fries | G06K 9/0002 341/20 |
| 6,654,050 | B2 * | 11/2003 | Karube | G06F 1/16 348/207.1 |
| 6,804,121 | B2 * | 10/2004 | Fischbach | G06K 9/0002 257/90 |
| 6,889,565 | B2 * | 5/2005 | DeConde | G06K 9/0002 73/862.042 |
| 6,924,496 | B2 * | 8/2005 | Manansala | G06K 9/00053 250/239 |
| 7,071,708 | B2 * | 7/2006 | Chou | G06K 9/00053 324/662 |
| 7,084,474 | B2 * | 8/2006 | Hung | H01L 27/14618 257/434 |
| 7,146,029 | B2 * | 12/2006 | Manansala | G06K 9/00026 382/126 |

(Continued)

*Primary Examiner* — Manav Seth (74) *Attorney, Agent, or Firm* — Muncy, Geissler, Olds & Lowe, P.C.

(57) ABSTRACT

A fingerprint identification module is installed in an accommodation space of an electronic device. The fingerprint identification module includes a circuit board, a fingerprint sensor and a resilient fixing plate. The fingerprint sensor is disposed on the circuit board, and detects a fingerprint image of a finger. The resilient fixing plate is located under the circuit board, connected with the circuit board, and contacted with a bottom side of the accommodation space. The resilient fixing plate is subjected to deformation and descended according to the accommodation space. Consequently, the fingerprint identification module installed in the accommodation space.

10 Claims, 6 Drawing Sheets

(56) References Cited

U.S. PATENT DOCUMENTS

| | | | | |
|---|---|---|---|---|
| 7,397,096 B2* | 7/2008 | Chou | ............... | G06K 9/00026 |
| | | | | 257/414 |
| 8,736,001 B2* | 5/2014 | Salatino | ............ | G06K 9/00053 |
| | | | | 257/415 |
| 9,058,511 B2* | 6/2015 | Chou | ................... | G06K 9/0002 |
| 9,158,958 B2* | 10/2015 | Wickboldt | ......... | G06K 9/00026 |
| 9,911,025 B2* | 3/2018 | Han | ..................... | G06K 9/0002 |
| 10,089,517 B2* | 10/2018 | Hsu | ................... | G06K 9/00053 |
| 2003/0048597 A1* | 3/2003 | Wang | .................... | G06F 1/1626 |
| | | | | 361/679.56 |
| 2003/0170933 A1* | 9/2003 | Manansala | ........... | G06K 9/0002 |
| | | | | 438/116 |
| 2006/0034499 A1* | 2/2006 | Shinoda | ............. | G06K 9/00013 |
| | | | | 382/124 |

* cited by examiner

FINGERPRINT IDENTIFICATION MODULE

FIELD OF THE INVENTION

The present invention relates to an identity identification element, and more particularly to a fingerprint identification module for identifying the identity of a user through a fingerprint.

BACKGROUND OF THE INVENTION

Recently, a fingerprint identification technology has been applied to a variety of electronic products. By using the fingerprint identification technology, the user's fingerprint can be inputted into an electronic product and saved in the electronic product. For unlocking the electronic product, the user has to input the fingerprint through a fingerprint identification module. The way of unlocking the electronic product by the fingerprint identification technology is faster and more user-friendly than the way of manually inputting the password. Consequently, the fingerprint identification technology is favored by many users, and the demands on the fingerprint identification module are gradually increased.

Figure 1:
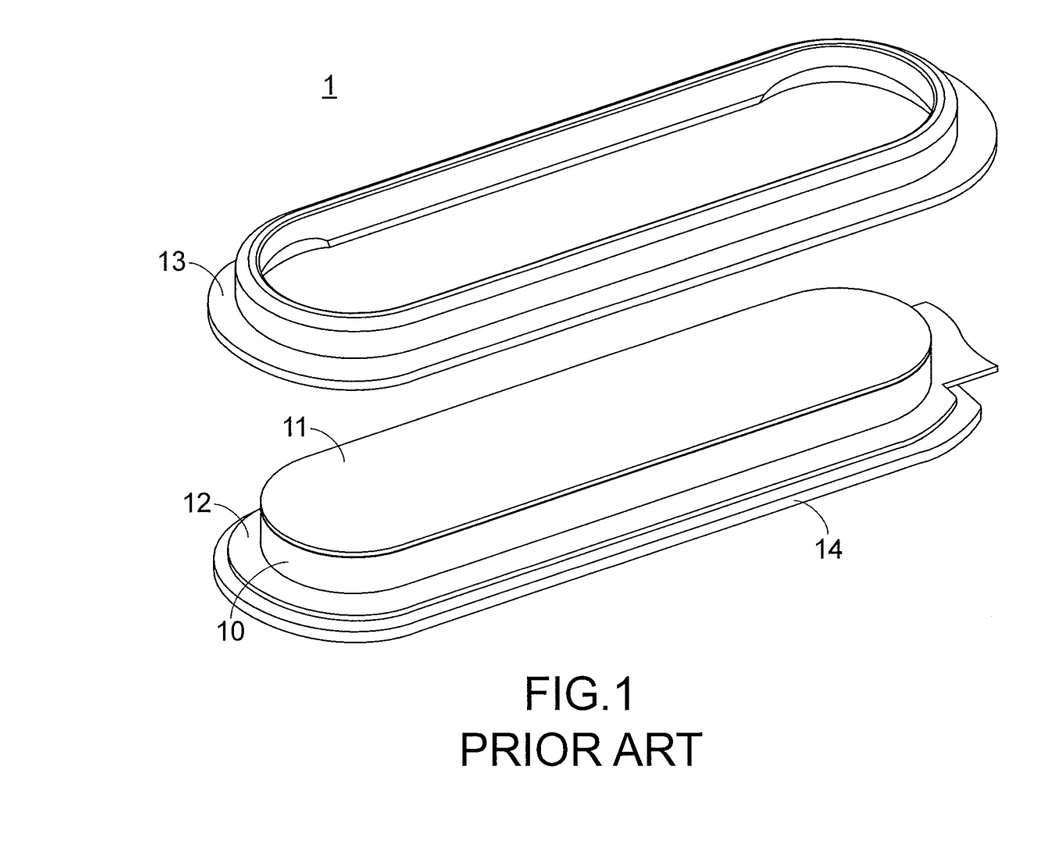
FIG. 1 is a schematic exploded view illustrating a structure of a conventional fingerprint identification module.

A structure of a conventional fingerprint identification module will be described as follows. FIG. 1 is a schematic exploded view illustrating a structure of a conventional fingerprint identification module. As shown in FIG. 1, the conventional fingerprint identification module 1 comprises a fingerprint sensor 10, a coating structure 11, a circuit board 12, a metallic ring 13 and a supporting plate 14. The fingerprint sensor 10 is disposed on and electrically connected with the circuit board 12 and acquires electric power from the circuit board 12. The fingerprint sensor 10 is used for sensing the user's finger and retrieving the information of the user's finger. The coating structure 11 is disposed on a top surface of the fingerprint sensor 10 by a coating technology. The coating structure 11 is used for protecting the fingerprint sensor 10. Moreover, the coating structure 11 provides a color that matches an electronic device or provides a desired color. The metallic ring 13 is sheathed around the fingerprint sensor 10. The metallic ring 13 is used for transferring the charges of the user's finger or the foreign charges. Consequently, the electrostatic discharge (ESD) is not generated. The supporting plate 14 is used for supporting the above components. Moreover, the supporting plate 14 is contacted with the circuit board 12 to increase the structural strength of the circuit board 12. Consequently, the circuit board 12 is not damaged in response to the external force.

After the fingerprint identification module 1 is assembled, the fingerprint identification module 1 is usually disposed within an accommodation space of an electronic device (not shown). At the same time, a portion of the fingerprint identification module 1 is exposed outside the fingerprint identification module 1 in order to be touched by the user's finger. Generally, the structures and the inner components of the electronic devices from different manufacturers are somewhat different. Since the heights of the accommodation spaces of the electronic devices from different manufacturers are possibly different, the structure of the fingerprint identification module 1 needs to be adjusted to comply with the height of the accommodation space of the electronic device where the fingerprint identification module 1 is installed. For example, if the height of the accommodation space is insufficient, the thickness of the supporting plate needs to be decreased. Consequently, the fingerprint identification module 1 can be installed in the accommodation space to match the electronic device. For the manufacturer of the fingerprint identification module, the process of adjusting the structure of the fingerprint identification module is time-consuming and labor-intensive. Under this circumstance, the production efficiency of the fingerprint identification module is impaired.

Therefore, there is a need of providing a fingerprint identification module with increased production efficiency.

SUMMARY OF THE INVENTION

The present invention provides a fingerprint identification module with increased production efficiency.

In accordance with an aspect of the present invention, there is provided a fingerprint identification module. The fingerprint identification module is installed in an accommodation space of an electronic device. The fingerprint identification module includes a circuit board, a fingerprint sensor and a resilient fixing plate. The fingerprint sensor is disposed on the circuit board, and detects a fingerprint image of a finger. The resilient fixing plate is located under the circuit board, connected with the circuit board, and contacted with a bottom side of the accommodation space. The resilient fixing plate is subjected to deformation and descended according to the accommodation space. Consequently, the fingerprint identification module installed in the accommodation space.

In an embodiment, the resilient fixing plate includes a main body, a supporting leg and a fastening element. The circuit board is connected with a top surface of the main body. The supporting leg is connected with the main body. An inclination angle of the supporting leg is adjusted according to a height of the accommodation space and elasticity of the supporting leg, so that the main body is descended. The fastening element is penetrated through the supporting leg, so that the supporting leg is fixed on the bottom side of the accommodation space. The supporting leg includes a base segment, a resilient segment and an opening. The base segment is contacted with the bottom side of the accommodation space. The resilient segment is connected with the main body and the base segment. The resilient segment is changed from an upright state to an inclined state according to elasticity of the resilient segment. The opening is formed in the base segment. The fastening element is penetrated through the opening, so that the base segment is fixed on the bottom side of the accommodation space.

From the above descriptions, the present invention provides the fingerprint identification module. The height of the resilient fixing plate to be decreased is calculated according to the height of the accommodation space and the height of the fingerprint identification module. The resilient fixing plate is subjected to deformation according to the elasticity of the resilient fixing plate. Consequently, the resilient segment of the resilient fixing plate is changed from an upright state to an inclined state. Due to the structure and the function of the resilient fixing plate, the height of the fingerprint identification module can be decreased through the simple operation. That is, it is not necessary to cut the thickness of some components of the fingerprint identification module according to the height of the accommodation space. Under this circumstance, the production efficiency of the fingerprint identification module is enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For solving the drawbacks of the conventional technologies, the present invention provides a fingerprint identification module.

Figure 2:
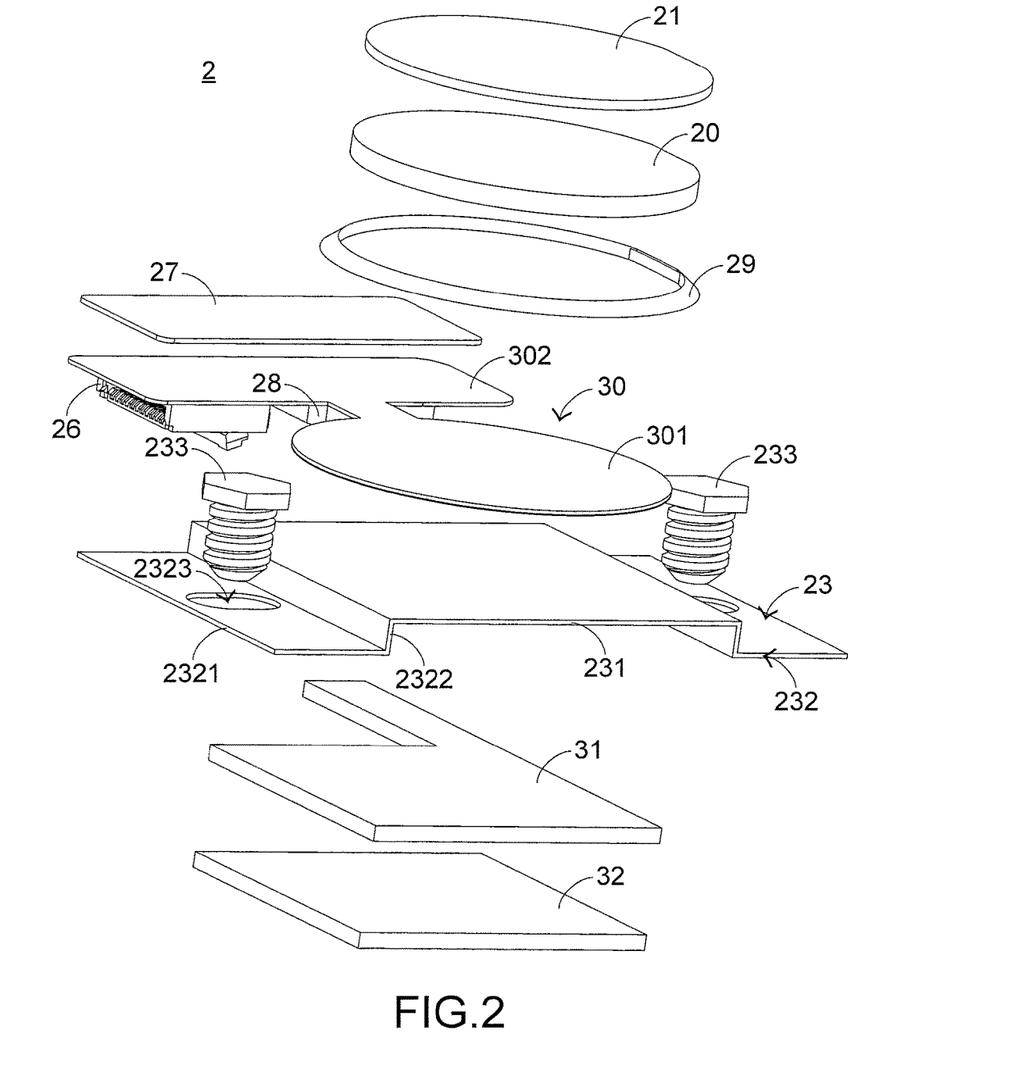
FIG. 2 is a schematic exploded view illustrating a fingerprint identification module according to an embodiment of the present invention and taken along a viewpoint.
Figure 3:
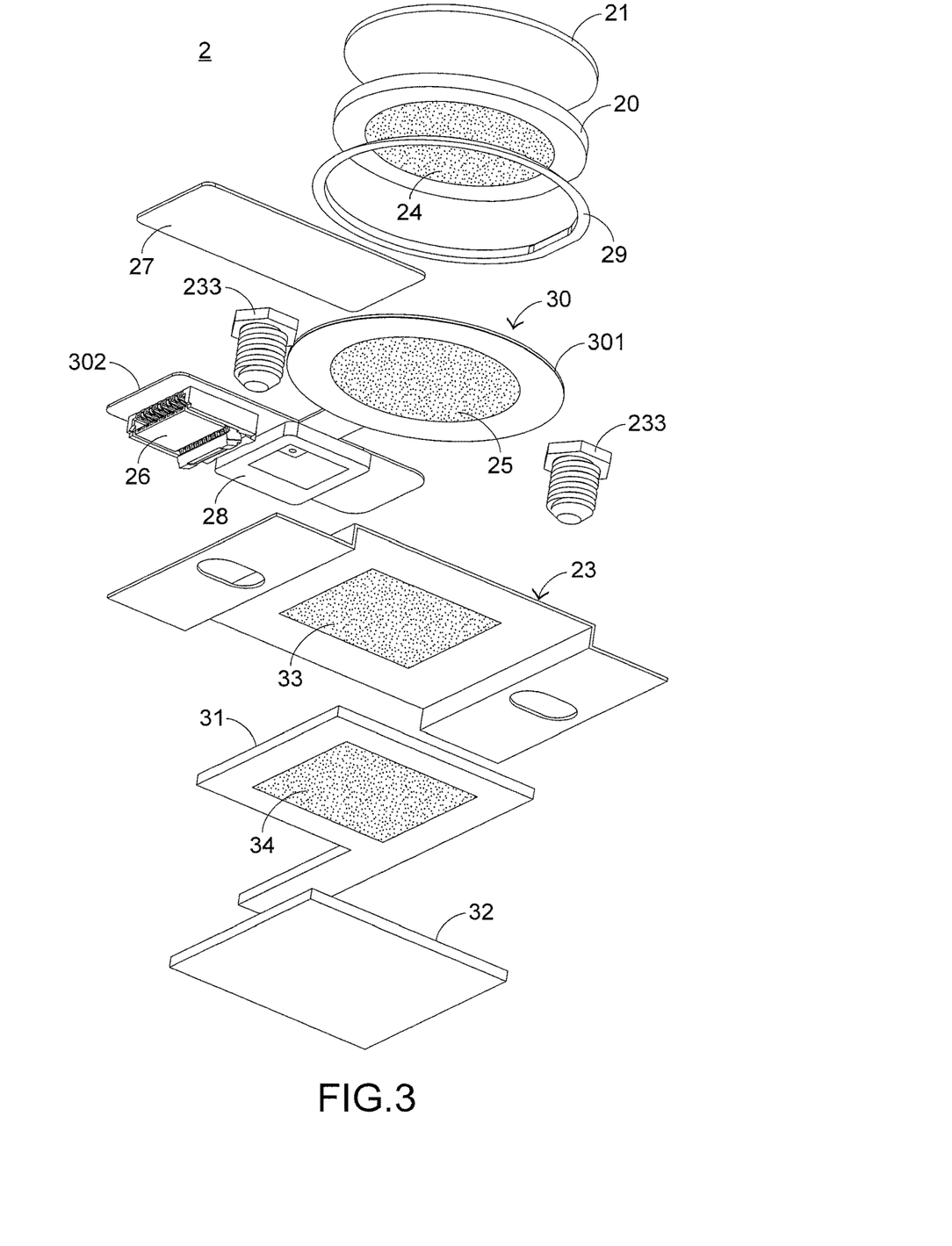
FIG. 3 is a schematic exploded view illustrating a fingerprint identification module according to the embodiment of the present invention and taken along another viewpoint.
Figure 4:
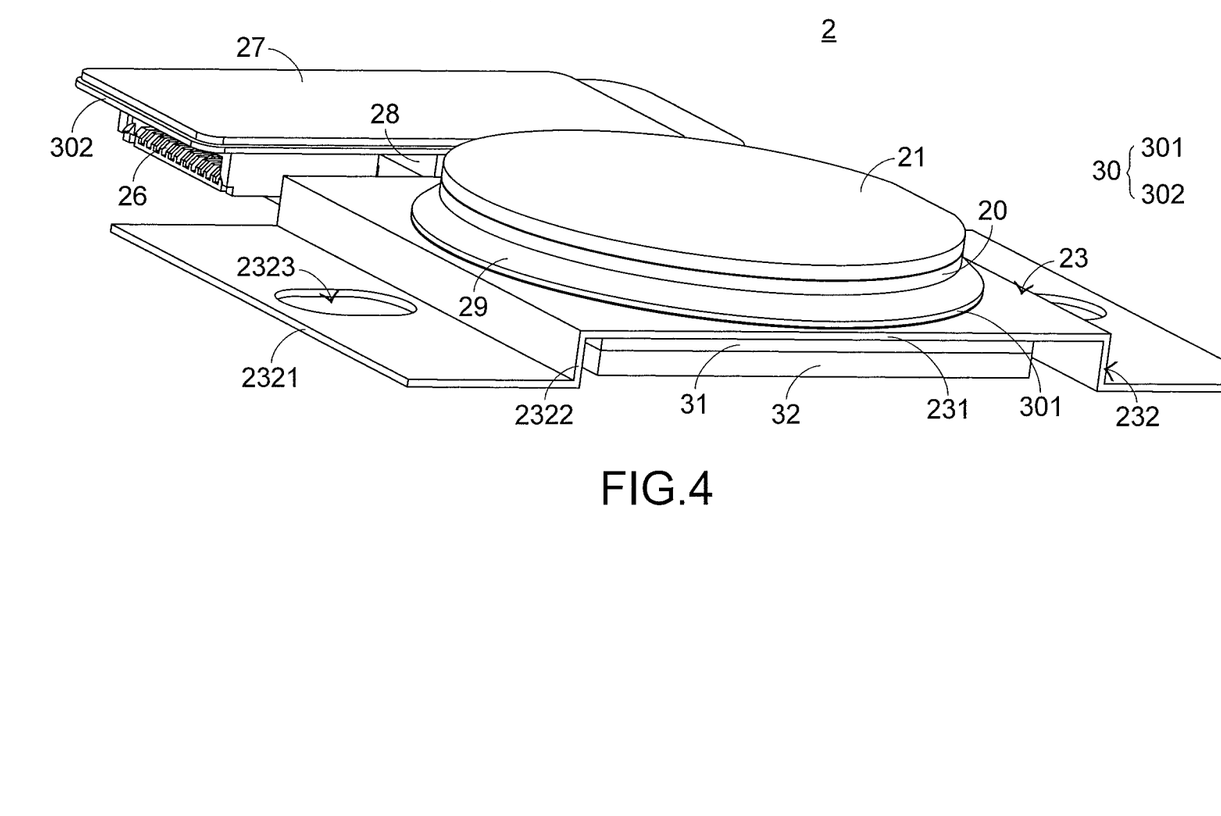
FIG. 4 is a schematic perspective view illustrating the fingerprint identification module according to the embodiment of the present invention.

Please refer to FIGS. 2, 3 and 4. FIG. 2 is a schematic exploded view illustrating a fingerprint identification module according to an embodiment of the present invention and taken along a viewpoint. FIG. 3 is a schematic exploded view illustrating a fingerprint identification module according to the embodiment of the present invention and taken along another viewpoint. FIG. 4 is a schematic perspective view illustrating the fingerprint identification module according to the embodiment of the present invention. The fingerprint identification module 2 can be installed in an accommodation space 41 (see FIG. 5) of an electronic device 4 (see FIG. 5). As shown in FIGS. 2 and 3, the components of the fingerprint identification module 2 comprise a fingerprint sensor 20, a covering element 21, a resilient fixing plate 23, a first adhesive layer 24, a second adhesive layer 25, a connector 26 (see FIG. 4), a supporting plate 27, plural electronic components 28, a sealing structure 29, a circuit board 30, a pressure sensing element 31, a soft element 32, a third adhesive layer 33 and a fourth adhesive layer 34.

The fingerprint sensor 20 is used for detecting a fingerprint image of a user's finger (not shown). The covering element 21 is disposed on a top surface of the fingerprint sensor 20 in order to protect the fingerprint sensor 20. The circuit board 30 is arranged between the fingerprint sensor 20 and the resilient fixing plate 23. The circuit board 30 is combined with the fingerprint sensor 20 and electrically connected with the fingerprint sensor 20. Preferably but not exclusively, the fingerprint sensor 20 is fixed on the circuit board 30 by a surface mount technology (SMT). In an embodiment, the fingerprint sensor 20 has a land grid array (LGA) package structure or a ball grid array (BGA) structure, and the circuit board 30 is a flexible printed circuit (FPC) or a rigid-flex board.

The resilient fixing plate 23 is located under the circuit board 30 and connected with the circuit board 30. The resilient fixing plate 23 is contacted with a bottom side 42 of the accommodation space 41. The resilient fixing plate 23 is subjected to deformation and descended according to the accommodation space 41. Consequently, the fingerprint identification module 2 can be installed in the accommodation space 41. Moreover, the fingerprint sensor 20, the covering element 21 and the circuit board 30 are supported on the resilient fixing plate 23. In an embodiment, the resilient fixing plate 23 comprises a main body 231, plural supporting legs 232 and plural fastening elements 233. The circuit board 30 is connected with a top surface of the main body 231. The plural supporting legs 232 are connected with bilateral sides of the main body 231. According to the height of the accommodation space 41 and the metallic elasticity of the supporting legs 232, the inclination angles of the supporting legs 232 are adjusted. Consequently, the main body 231 is descended.

Each supporting leg 232 comprises a base segment 2321, a resilient segment 2322 and an opening 2323. The base segment 2321 is contacted with the bottom side 42 of the accommodation space 41. The resilient segment 2322 is connected with the main body 231 and the base segment 2321. According to the metallic elasticity of the resilient segment 2322, the resilient segment 2322 is changed from an upright state to an inclined state. Each fastening element 233 corresponds to one supporting leg 232. The fastening elements 233 are penetrated through the openings 2323 of the corresponding supporting legs 232 in order to fix the plural supporting legs 232 on the bottom side 42 of the accommodation space 41. In an embodiment, the base segments 2321 and the resilient segments 2322 are integrally formed with the main body 231 and made of a metallic material.

Please refer to FIGS. 2, 3 and 4 again. The circuit board 30 comprises a first wiring plate 301 and a second wiring plate 302. The second wiring plate 302 is extended from the first wiring plate 301. The first wiring plate 301 is electrically connected with the fingerprint sensor 20 and contacted with the resilient fixing plate 23. The resilient fixing plate 23 is located under the first wiring plate 301 of the circuit board 30 and connected with the first wiring plate 301. The resilient fixing plate 23 is used for supporting the first wiring plate 301 and increasing the structural strength of the first wiring plate 301. In this embodiment, the circuit board 30 comprises two wiring plates. The two wiring plates are integrally formed, and the internal circuits of the two wiring plates are electrically connected with each other. The circuit board with two wiring plates is aesthetically pleasing. Alternatively, in another embodiment, the circuit board comprises a single wiring plate, which is the integral structure of the first wiring plate and the second wiring plate.

The pressure sensing element 31 is connected with a bottom surface of the main body 231 and electrically connected with the second wiring plate 302 of the circuit board 30. When a pressing force of the user's finger is received by the fingerprint sensor 20, the pressing force is detected by the pressure sensing element 31 and thus a pressure signal corresponding to the pressing force is generated by the pressure sensing element 31. The soft element 32 is located under the pressure sensing element 31 and connected with the pressure sensing element 31. The soft element 32 is contacted with the bottom side 42 of the accommodation space 41. When the pressing force of the user's finger is received by the fingerprint sensor 20, the soft element 32 provides a counterforce to the pressure sensing element 31. When the pressure sensing element 31 is depressed, the pressure sensing element 31 has to receive the counterforce that opposes the pressing force. In response to counterforce, the pressure sensing element 31 can be normally operated. In an embodiment, the pressure sensing element 31 is a pressure sensor, and the soft element 32 is a foam structure. Since the pressure sensing element 31 is located under the resilient fixing plate 23, the fingerprint identification module 2 has a pressure sensing function and the functionality of the fingerprint identification module 2 is enhanced.

The associated components are combined together through the first adhesive layer 24, the second adhesive layer 25, the third adhesive layer 33 and the fourth adhesive layer 34. The first adhesive layer 24 is disposed on the bottom surface of the covering element 21 or the top surface of the fingerprint sensor 20. The covering element 21 and the fingerprint sensor 20 are combined together through the first adhesive layer 24. The second adhesive layer 25 is disposed on the bottom surface of the first wiring plate 301 or the top surface of the main body 231 of the resilient fixing plate 23. The first wiring plate 301 and the resilient fixing plate 23 are combined together through the second adhesive layer 25. The third adhesive layer 33 is disposed on the bottom surface of the main body 231 of the resilient fixing plate 23 or the top surface of the pressure sensing element 31. The resilient fixing plate 23 and the pressure sensing element 31 are combined together through the third adhesive layer 33. The fourth adhesive layer 34 is disposed on the bottom surface of the pressure sensing element 31 or the top surface of the soft element 32. The pressure sensing element 31 and the soft element 32 are combined together through the fourth adhesive layer 34.

In an embodiment, the first adhesive layer 24, the second adhesive layer 25, the third adhesive layer 33 and the fourth adhesive layer 34 are non-liquid double-side tapes or liquid adhesives. The following two aspects should be specially described. Firstly, the second adhesive layer is a conductive adhesive layer according to the practical requirement. Consequently, the electric conduction between the circuit board 30 and the resilient fixing plate 23 is enhanced. Secondly, the pressure sensing element 31 is electrically connected with the second wiring plate 302 of the circuit board 30 through an anisotropic conductive film (ACF). Consequently, the pressure sensing element 31 is securely fixed on the circuit board 30, and the electric conductivity is enhanced.

The connector 26 is disposed on a first surface of the second wiring plate 302. The electric connection between the second wiring plate 302 and an external electronic element (not shown) is established through the connector 26. For example, the external electronic element is a connection part of an electronic device 4 where the fingerprint identification module 2 is installed. The electric connection between the fingerprint identification module 2 and the electronic device 4 is established through the connector 26.

The supporting plate 27 is disposed on a second surface of the second wiring plate 302. That is, the second wiring plate 302 is disposed on an opposite side of the connector 26. The supporting plate 27 is used for increasing the structural strength of the second wiring plate 302. Consequently, the connector 26 can be securely fixed on the second wiring plate 302. The plural electronic components 28 are disposed on the second wiring plate 302 for providing special functions. The sealing structure 29 is disposed on the first wiring plate 301 of the circuit board 30 and arranged around the fingerprint sensor 20. By the sealing structure 29, the foreign matter (e.g., the foreign liquid or foreign dust) is prevented from entering the region between the fingerprint sensor 20 and the circuit board 30. In an embodiment, the plural electronic components 28 comprise capacitors, diodes or processors, and the sealing structure 29 is a sealant.

In an embodiment, the covering element 21 is made of a glass material. In another embodiment, the covering element is made of a ceramic material. In a preferred embodiment, the covering element further comprises an anti-fingerprint layer and a color layer. The anti-fingerprint layer is disposed on the top surface of the covering element. Due to the anti-fingerprint layer, the fingerprint pattern is not adsorbed on the covering element and the covering element is kept clean. Moreover, since the fingerprint pattern is not easily retained on the anti-fingerprint layer, the fingerprint sensor can accurately detect the fingerprint image of the user's finger. That is, the detecting result is not influenced by the retained fingerprint pattern. The color layer is disposed on the bottom surface of the covering element in order to express the desired color of the covering element. Consequently, the covering element is aesthetically pleasing.

Figure 5:
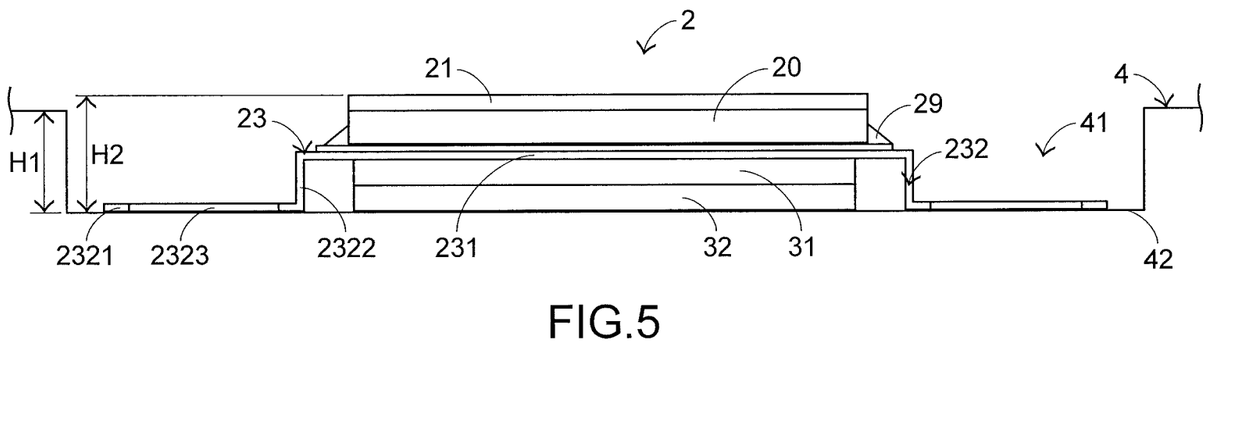
FIG. 5 is a schematic cross-sectional view illustrating the fingerprint identification module according to the embodiment of the present invention, in which the fingerprint identification module is placed in an accommodation space.
Figure 6:
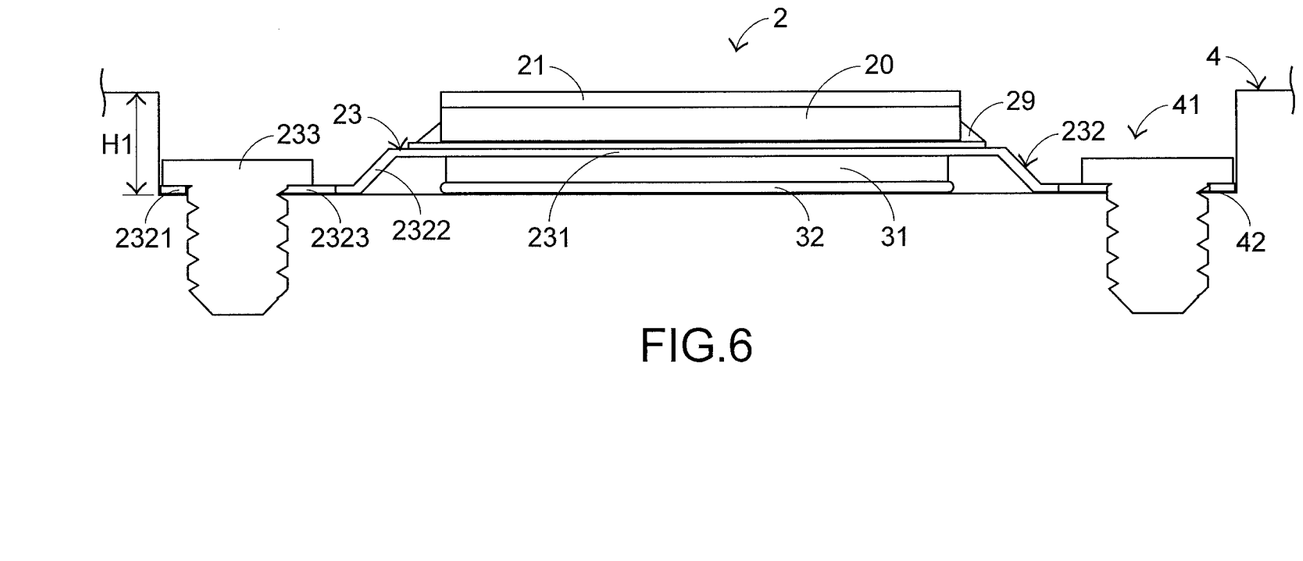
FIG. 6 is a schematic cross-sectional view illustrating the fingerprint identification module of FIG. 5, in which the resilient fixing plate of the fingerprint identification module is subjected to deformation.

After the above components are combined together, the fingerprint identification module 2 is assembled. The resulting structure of the fingerprint identification module 2 is shown in FIG. 4. However, in FIG. 4, the fastening elements 233 have not been connected with the base segment 2321. FIG. 5 is a schematic cross-sectional view illustrating the fingerprint identification module according to the embodiment of the present invention, in which the fingerprint identification module is placed in an accommodation space. FIG. 6 is a schematic cross-sectional view illustrating the fingerprint identification module of FIG. 5, in which the resilient fixing plate of the fingerprint identification module is subjected to deformation. As shown in FIG. 5, the fingerprint identification module 2 is placed in the accommodation space 41 of the electronic device 4. Meanwhile, the height of the accommodation space 41 is H1, and the height of the fingerprint identification module 2 is H2, wherein H2 is larger than H1. For well installing the fingerprint identification module 2 in the accommodation space 41, the top surface of the covering element 21 and the top surface of the electronic device 4 should be at the same level with each other. In other words, it is necessary to descend the fingerprint identification module 2.

A process of installing the fingerprint identification module 2 in the accommodation space 41 will be described as follows. Firstly, the inclination angles of the supporting legs 232 are adjusted according to the height H1 of the accommodation space 41. Since the resilient fixing plate 23 is made of a metallic material and the resilient segments 2322 have the metallic elasticity, the resilient segments 2322 are switched from an upright state to an inclined state in response to the deformation of the resilient segments 2322. Then, the fastening elements 233 are penetrated through the corresponding openings 2323. Moreover, the fastening elements 233 are away from the main body 231. That is, the fastening elements 233 are moved away from the bilateral sides of the resilient fixing plate 23. Consequently, the resilient segments 2322 are switched from the upright state to the inclined state. After the height of the fingerprint identification module 2 is reduced from H2 to H1, the fastening elements 233 are further penetrated through the corresponding openings 2323 and contacted with the bottom side of the accommodation space 41. Consequently, as shown in FIG. 6, the base segments 2321 of the supporting legs 232 are securely fixed on the bottom side 42 of the accommodation space 41. In other words, the inclined state of the resilient segment 2322 is determined according to the contact position between the fastening element 233 and the bottom side 42 of the accommodation space 41. In case that the inclination angle of the supporting leg 232 is larger, the height of the fingerprint identification module 2 is lower.

In an embodiment, the fastening elements 233 are screws, and the bottom side of the accommodation space has bolt holes (not shown) corresponding to the screws. It is noted that numerous modifications and alterations may be made while retaining the teachings of the invention. For example, in another embodiment, the fastening elements are pins. Moreover, the bottom side of the accommodation space has indentations corresponding to the pins. The pins are inserted into the corresponding indentations.

The following two aspects should be specially described. Firstly, the height of the fingerprint identification module 2 is adjustable according to the deformation of the resilient fixing plate 23, and thus the top surface of the covering element 21 and the top surface of the electronic device 4 are adjusted to be at the same level with each other. As the height of the fingerprint identification module 2 is decreased, the pressure sensing element 31 is closer to the bottom side 42 of the accommodation space 41. That is, the distance between the pressure sensing element 31 and the bottom side 42 of the accommodation space 41 is changed. Since the counterforce received by the pressure sensing element 31 in response to the pressing force is also changed, the pressure sensing function of the pressure sensing element 31 is inconsistent. For maintaining the consistent pressure sensing function of the pressure sensing element 31, the fingerprint identification module 2 is further equipped with the soft element 32 under the pressure sensing element 31. When the distance between the pressure sensing element 31 and the bottom side 42 of the accommodation space 41 is changed, the soft element 32 is pushed by the pressure sensing element 31 and thus the soft element 32 is changed to a compressed state. Since the soft element 32 is capable of absorbing vibration, the soft element 32 has the function of absorbing forces. When the pressure sensing element 31 is depressed and the counterforce is generated, a portion of the counterforce is absorbed by the soft element. Since the counterforce received by the pressure sensing element 31 is substantially constant, the pressure sensing function of the pressure sensing element 31 is maintained consistent.

Secondly, the pressure sensing function is not essential to the fingerprint identification module of the present invention. In some other embodiments, the fingerprint identification module is not equipped with the pressure sensing element and the soft element.

From the above descriptions, the present invention provides the fingerprint identification module. The height of the resilient fixing plate to be decreased is calculated according to the height of the accommodation space and the height of the fingerprint identification module. The resilient fixing plate is subjected to deformation according to the elasticity of the resilient fixing plate. Consequently, the resilient segment of the resilient fixing plate is changed from an upright state to an inclined state. Due to the structure and the function of the resilient fixing plate, the height of the fingerprint identification module can be decreased through the simple operation. That is, it is not necessary to cut the thickness of some components of the fingerprint identification module according to the height of the accommodation space. Under this circumstance, the production efficiency of the fingerprint identification module is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A fingerprint identification module installed in an accommodation space of an electronic device, the fingerprint identification module comprising:
    a circuit board;
    a fingerprint sensor disposed on the circuit board, and detecting a fingerprint image of a finger; and
    a resilient fixing plate located under the circuit board, connected with the circuit board, and contacted with a bottom side of the accommodation space, wherein the resilient fixing plate is subjected to deformation and descended according to the accommodation space, so that the fingerprint identification module installed in the accommodation space.

2. The fingerprint identification module according to claim 1, wherein the resilient fixing plate comprises:
    a main body, wherein the circuit board is connected with a top surface of the main body;
    a supporting leg connected with the main body, wherein an inclination angle of the supporting leg is adjusted according to a height of the accommodation space and elasticity of the supporting leg, so that the main body is descended; and
    a fastening element penetrated through the supporting leg, so that the supporting leg is fixed on the bottom side of the accommodation space.

3. The fingerprint identification module according to claim 2, wherein the supporting leg comprises:
    a base segment contacted with the bottom side of the accommodation space;
    a resilient segment connected with the main body and the base segment, wherein the resilient segment is changed from an upright state to an inclined state according to elasticity of the resilient segment; and
    an opening formed in the base segment, wherein the fastening element is penetrated through the opening, so that the base segment is fixed on the bottom side of the accommodation space.

4. The fingerprint identification module according to claim 3, wherein the inclined state of the resilient segment is determined according to a contact position between the fastening element and the bottom side of the accommodation space.

5. The fingerprint identification module according to claim 2, further comprising:
    a pressure sensing element connected with a bottom surface of the main body and electrically connected with the circuit board, wherein when the fingerprint sensor receives a pressing force, the pressure sensing element detects the pressing force and generates a pressure signal corresponding to the pressing force; and
    a soft element located under the pressure sensing element, connected with the pressure sensing element, and contacted with the bottom side of the accommodation space, wherein when the fingerprint sensor receives the pressing force, the soft element provides a counterforce to the pressure sensing element.

6. The fingerprint identification module according to claim 5, wherein the soft element is a foam structure.

7. The fingerprint identification module according to claim 1, further comprising a covering element, wherein the covering element is disposed on a top surface of the fingerprint sensor to protect the fingerprint sensor.

8. The fingerprint identification module according to claim 5, wherein the circuit board comprises:
    a first wiring plate electrically connected with the fingerprint sensor and contacted with the resilient fixing plate; and a second wiring plate extended from the first wiring plate and electrically connected with the pressure sensing element.

9. The fingerprint identification module according to claim 8, further comprising:
- a connector disposed on a first surface of the second wiring plate, wherein the second wiring plate and an external electronic element are electrically connected with each other through the connector;
- a supporting plate disposed on a second surface of the second wiring plate so as to increase a structural strength of the second wiring plate; and
- an electronic component disposed the first surface of the second wiring plate.

10. The fingerprint identification module according to claim 1, further comprising a sealing structure, wherein the sealing structure is disposed on the circuit board and arranged around the fingerprint sensor so as to prevent a foreign matter from entering a region between the fingerprint sensor and the circuit board.

\* \* \* \* \*